United States Patent
Devireddy et al.

(10) Patent No.: US 9,055,139 B1
(45) Date of Patent: Jun. 9, 2015

(54) DISPLAY PROTOCOL INTERCEPTION IN THE NETWORK FOR SERVICES AND NETWORK-BASED MULTIMEDIA SUPPORT FOR VDI

(75) Inventors: Dileep K. Devireddy, San Jose, CA (US); Chickayya Naik, San Jose, CA (US); Giovanni Meo, Rome (IT); Ashoka Kallappa, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 13/417,418

(22) Filed: Mar. 12, 2012

(51) Int. Cl.
G06F 15/16 (2006.01)
H04L 29/06 (2006.01)
H04L 29/08 (2006.01)
H04L 12/911 (2013.01)

(52) U.S. Cl.
CPC .............. H04L 65/80 (2013.01); *H04L 29/06* (2013.01); *H04L 65/4076* (2013.01); *H04L 65/4084* (2013.01); *H04L 29/08576* (2013.01); *H04L 47/70* (2013.01); *H04L 67/2814* (2013.01); *H04L 63/0236* (2013.01)

(58) Field of Classification Search
CPC ... H04L 29/08576; H04L 29/06; H04L 47/70; H04L 67/2814; H04L 29/06047; H04L 47/10; H04L 63/0236; H04L 47/2416; H04L 47/2433; H04L 63/0272; H04L 63/0281; H04L 65/605; H04L 65/80; H04L 65/4084; H04L 65/4076
USPC ....................................................... 709/227
See application file for complete search history.

(56) References Cited

U.S. PATENT DOCUMENTS

| 6,226,642 | B1 * | 5/2001 | Beranek et al. .......... 348/211.13 |
| 6,738,804 | B1 | 5/2004 | Lo |
| 7,502,836 | B1 * | 3/2009 | Menditto et al. ............... 709/217 |
| 7,568,056 | B2 | 7/2009 | Danilak |
| 7,681,134 | B1 | 3/2010 | Grechishkin et al. |
| 7,899,864 | B2 | 3/2011 | Margulis |

(Continued)

FOREIGN PATENT DOCUMENTS

WO    0057612 A2    9/2000

OTHER PUBLICATIONS

Kerner, Sean Michael, "Riverbed Accelerates UDP with RiOS 7," Dec. 5, 2011.

(Continued)

*Primary Examiner* — John Breene
*Assistant Examiner* — Eyob Hagos
(74) *Attorney, Agent, or Firm* — Edell, Shapiro & Finnan, LLC (57) ABSTRACT

An apparatus and related method are provided for improving the performance of virtual desktop services. A network device is deployed in a network to intercept packets of a control session initiated by a client with a connection broker to obtain data from a host. The network device initiates a new control session to the connection broker on behalf of the client. The network device receives host information from the connection broker, replaces address information of the network device for the host information in a control session message and sends the control session message to the client. The network device establishes a data session with the client, initiates a data session with the host on behalf of the client and relays data between the data session with the host and the data session with the client such that the network device is transparent to the client and the host.

24 Claims, 8 Drawing Sheets

(56) References Cited

U.S. PATENT DOCUMENTS

| | | | |
|---|---|---|---|
| 8,135,616 B2 | 3/2012 | Callaghan et al. | |
| 8,352,875 B2 | 1/2013 | Peltz et al. | |
| 8,374,113 B2 | 2/2013 | Meier et al. | |
| 8,549,087 B2 | 10/2013 | Leonard | |
| 8,549,151 B2 * | 10/2013 | Stokking et al. | 709/227 |
| 2003/0051070 A1 | 3/2003 | Shappir et al. | |
| 2003/0142127 A1 | 7/2003 | Markel | |
| 2006/0005187 A1 | 1/2006 | Neil | |
| 2006/0104259 A1 | 5/2006 | Caballero-McCann et al. | |
| 2006/0230105 A1 | 10/2006 | Shappir et al. | |
| 2006/0230156 A1 | 10/2006 | Shappir et al. | |
| 2006/0230438 A1 | 10/2006 | Shappir et al. | |
| 2007/0005365 A1 | 1/2007 | Goodman et al. | |
| 2007/0018992 A1 | 1/2007 | Wong | |
| 2007/0116246 A1 | 5/2007 | Walker et al. | |
| 2008/0037516 A1 | 2/2008 | Cai | |
| 2009/0021583 A1 | 1/2009 | Salgar et al. | |
| 2009/0181702 A1 | 7/2009 | Vargas et al. | |
| 2009/0248802 A1 | 10/2009 | Mahajan et al. | |
| 2009/0249216 A1 | 10/2009 | Charka et al. | |
| 2009/0287772 A1 | 11/2009 | Stone et al. | |
| 2010/0138744 A1 | 6/2010 | Kamay et al. | |
| 2010/0146504 A1 | 6/2010 | Tang | |
| 2010/0153544 A1 | 6/2010 | Krassner et al. | |
| 2010/0169281 A1 | 7/2010 | Atluri et al. | |
| 2010/0303061 A1 | 12/2010 | Wan et al. | |
| 2011/0010615 A1 | 1/2011 | Dees et al. | |
| 2011/0066703 A1 * | 3/2011 | Kaplan et al. | 709/219 |
| 2011/0126110 A1 | 5/2011 | Vilke et al. | |
| 2011/0184918 A1 | 7/2011 | Atluri et al. | |
| 2011/0307614 A1 * | 12/2011 | Bernardi et al. | 709/227 |
| 2012/0054744 A1 | 3/2012 | Singh et al. | |
| 2012/0084774 A1 | 4/2012 | Post et al. | |
| 2012/0092438 A1 | 4/2012 | Guzman Suarez et al. | |
| 2012/0110131 A1 | 5/2012 | Villagas Nunez et al. | |
| 2012/0226985 A1 | 9/2012 | Chervets et al. | |
| 2012/0226998 A1 | 9/2012 | Freidl et al. | |
| 2012/0246554 A1 | 9/2012 | Shappir | |
| 2012/0284632 A1 | 11/2012 | Baird et al. | |
| 2012/0331127 A1 | 12/2012 | Wang et al. | |
| 2013/0007150 A1 | 1/2013 | Hertz et al. | |
| 2013/0013664 A1 | 1/2013 | Baird et al. | |
| 2013/0024906 A9 | 1/2013 | Carney et al. | |
| 2013/0067374 A1 | 3/2013 | Dantec et al. | |
| 2013/0125215 A1 * | 5/2013 | London et al. | 726/4 |
| 2013/0304902 A1 * | 11/2013 | Demmer et al. | 709/224 |

OTHER PUBLICATIONS

CISCO Data Sheet, "Cisco Unified Survivable Remote Site Telephone Version 4.1," 2008.

HDX™ Technologies, 2011, 2 pages.

Wyse, "Wyse Thin Computing Software, Delivering the best experience over virtualized desktop environments, Summary Data," 9 pages, 2010.

Greenberg, et al., "Adaptive Offloading for Pervasive Computing," IEEE Pervasive Computing, vol. 3, No. 3, Jul.-Sep. 2004, pp. 66-73.

Interdigital, "Video-Aware Link Adaption," White Paper, www.interdigital.com, Oct. 2012, pp. 1-8.

Ericom, "Ericom Blaze, A Breakthrough in RDP Acceleration and Compression," http://www.ericom.com/specs/Ericom_Blaze.pdf, retrieved Oct. 2013, 2 pages.

Cisco, "Cisco Virtualization Experience Infrastructure (VXI)-An End-to-End Virtualization System", BRKVIR-2010, Cisco Live!, Jun. 2010, 56 pages.

* cited by examiner

DISPLAY PROTOCOL INTERCEPTION IN THE NETWORK FOR SERVICES AND NETWORK-BASED MULTIMEDIA SUPPORT FOR VDI

TECHNICAL FIELD

The present disclosure relates to virtual desktop infrastructure (VDI) and network devices.

BACKGROUND

Hosted virtual desktop is a technology in which the desktop compute and storage functions are centralized and often virtualized on a server farm in a data center. This technology has a number of benefits to enterprises as well as end users, and is rapidly gaining popularity. However, the peripheral/human interaction devices like keyboard, mouse, monitor, headsets, web cameras, etc., still need to be present with the user. These devices communicate to the compute function/instance over a network using a display protocol.

Since the peripheral devices (henceforth referred to as the "client") are stateless, users can use any such available devices and access their own compute/desktop environment (henceforth referred as the "host") present in a datacenter, for example. Another entity called a "connection broker" negotiates the association between the client and the host based on the user credentials. For this purpose, the client communicates with the connection broker and presents the credentials of the user for accessing the host associated with the user. The connection broker validates the credentials and notifies the host about the client identity while passing this host identity to the client. This enables the client to communicate to the host while the host can ensure that the client that is communicating with it is indeed a legitimate client with an authorized user.

While the hosted virtual desktop model has a number of advantages over the conventional "thick client" model, it has its own set of challenges. One challenge is that multimedia traffic is "hair-pinned" over the network and the media is delivered to the display at the user device (client) in a display protocol specific format. Network caching schemes can reduce the bandwidth consumed by the native rich media but cannot be used for the multimedia delivered to the virtual desktop clients. In addition, voice traffic is subject to latency and jitter introduced by a hypervisor scheduler. Hypervisors are designed for compute intensive environments like servers and are not designed to handle real-time tasks, such as processing voice traffic. The communication between the compute instance and the client is encrypted and most of the display protocols use one reliable session for communication. This limits the ability for the network devices to prioritize the traffic based on the type or to apply security policies in the network infrastructure.

DESCRIPTION OF EXAMPLE EMBODIMENTS

Overview

An apparatus and related method are provided for improving the performance of virtual desktop infrastructure (VDI) sessions using the network infrastructure. A network device is deployed in a network to intercept packets of a control session initiated by a client between the client and a connection broker to obtain data from a host. The network device initiates a new control session to the connection broker on behalf of the client. The network device receives host information from the connection broker, replaces address information of the network device for the host information in a control session message and sends the control session message to the client. The network device also stores data that maps the client to the host.

Based on the information in the control session, the client initiates a data session (e.g., display session) to the network device. The network device establishes the display session with the associated host on behalf of the client based on the mapping information obtained from the control session. The network device also terminates encryption if these sessions are encrypted. Once both the sessions are established, the network device relays data between the display session with the host and the display session with the client such that the network device is transparent to the client and the host. Various applications and extended service capabilities can be supported using a network device configured in this manner. The network device is referred to herein as a virtual desktop server (VDS).

EXAMPLE EMBODIMENTS

Figure 1:
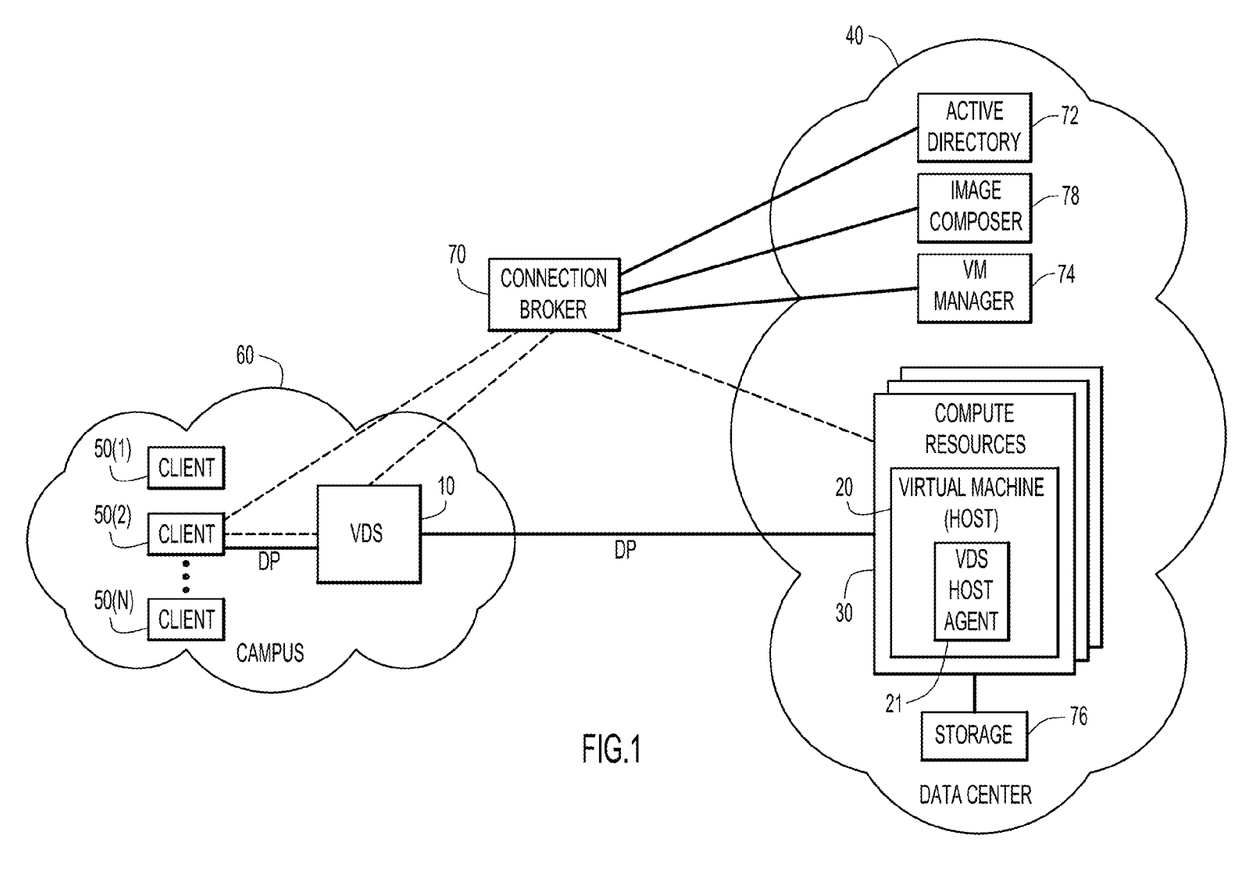
FIG. 1 is a system block diagram illustrating the use of a network device, called a virtual desktop server (VDS), to proxy the virtual desktop infrastructure (VDI) control and data session between a client and a connection broker or host.

Referring first to FIG. 1, a diagram is shown of a virtual desktop infrastructure (VDI) in which a network element or device, also called a virtual desktop server (VDS) 10, is provided to insert itself in a session between a client and a host. The components of the VDI are briefly described before describing in more detail the purpose and operation of the VDS 10.

A user compute environment is called a host. A host can be a virtual machine (VM) instance running in a hypervisor environment that shares the physical compute resources with other VM instances or a dedicated compute blade for power users. The operating system and all user applications are executed on the host. In addition, a small agent or receiver plug-in is present on the host for the purpose of communicating with the client and the connection broker elements described below. An example of a host is a VM shown at 20 that runs on compute resources 30 in a datacenter 40. Also a Host Agent/plug-in 21 is included within the VM 20 to coordinate communications with the VDS 10. This Host Agent 21 is also called a VDS Host Agent.

A client is a device residing on a user desk (or in a user's hand) and is capable of communicating to the host VM 20 in the datacenter 40. Examples of clients are shown at reference numerals 50(1)-50(N) in FIG. 1. The client aggregates peripherals, such as a keyboard, mouse, printer, Universal Serial Bus (USB) devices such as storage, card readers, etc., and acts as the interface between the peripherals and host. The client can be a re-purposed computer running the host communication software called a "soft client." Also, purpose-built devices are available with minimal/no local execution environment called "thin clients." The host communication component can be software running on the thin client or embedded in a chip with no additional software on the thin client. The clients without software are called "zero clients" and they require no management. Software based thin clients or re-purposed computers require some amount of management as they often run a flavor of an operating system.

The VDS 10 and the clients 50(1)-50(N) may reside on a campus network 60. The datacenter 40 may be remote from the campus network 60. As a result, the network VDS 10 interfaces across a wide area network (WAN), e.g., the Internet, to the datacenter 40.

A device called a connection broker is shown at reference numeral 70 in FIG. 1. The connection broker 70 is the part of the VDI system architecture, and determines a host to which a user (client) is assigned or connected. The connection broker 70 may be implemented as a full-blown management device allowing for the automatic deployment and provisioning of hosts. An administrator accesses the connection broker 70 for provisioning desktops and associating users to the desktops. The connection broker 70 acts as an intermediary for the control communication between the client and the host. A client communicates with connection broker 70 for user authentication and determining the host associated with the user.

Other components that play a role in the VDI infrastructure are now described. There is an active directory (AD) 72, a VM manager (VC) 74 and a storage unit 76. The connection broker 70 interfaces with the active directory 72 for validating the user credentials. Also, VDI specific user attributes are stored in the active directory 72 and the connection broker 70 utilizes this information when setting up the client-to-host sessions.

In a virtualized environment, host VMs can be launched dynamically based on client connection requests. Whenever the client requests access to compute resources 30 on behalf of a user, the connection broker 70 interacts with the VM Manager 74 for launching the VM if the VM is not active. The VM Manager 74 is responsible for determining the server (among the compute resources 30) for hosting the VM. Similarly, when the user session is disconnected, the connection broker 70 interfaces with VM manager 74 to power or shut down the VM either immediately or after certain inactivity time.

The VDI infrastructure centralizes the storage for all the users in the datacenter 40. This requires a relatively large amount of storage for storing user images, applications, customizations and data. Also this storage should be accessible from any compute device in the virtualized environment. The storage unit 76 performs these operations. There are several technologies emerging in this area for optimizing the storage utilization. For example, images and applications are stored in a common storage and the host images are dynamically composed on-demand from these images after applying user specific customizations.

An image composer 78 is provided for creating user specific virtual disks and attaching the same to the hosts. The connection broker 70 determines the user image by interacting with the image composer 78.

The VDI model has several advantages over the traditional desktop model in the enterprise environment. However, it also has its own set of unique challenges. Some of these challenges are inherent to the architecture while others are largely due to how this model has evolved. In the conventional/original VDI desktop delivery model, the entire desktop is rendered on the host and delivered to the client in the form of pixels over the display delivery protocol. This scheme is not suitable for multimedia, e.g., video, as the frame refresh rates are very low over the display protocol and consumes a large amount of bandwidth over the network. In the VDI environment video conversion into screen pixels is performed in software without any graphics hardware assist. This is a very CPU intensive operation and a low quality video can easily hog the entire CPU resources.

One application of the VDS 10 is in terminating a display protocol. A display protocol (also known as "Desktop Protocol") is used for communication between the clients and the hosts. One function of the display protocol is to transport the user interaction with peripherals such as keyboard keystrokes, mouse events to the host and display data from the host to the monitor attached to the client. In addition, the peripheral properties, such as display resolution, keyboard type, status of auxiliary devices (e.g., USB headset, printers, etc.) are exchanged via the desktop protocol.

A display protocol in a VDI environment allows rendering of the graphics driven by the applications running in the host over the thin client sitting in front of the user. Examples of display protocols are Remote Desktop Protocol (RDP) from Microsoft, Independent Computer Architecture (ICA) from Citrix, PC-over-IP (PCoIP) from Teradici/VMAWARE, SPICE from RedHat, Remote Graphics Software (RGS) from Hewlett-Packard, and Experience Optimized Software (EOP) from Quest Software.

Figure 2:
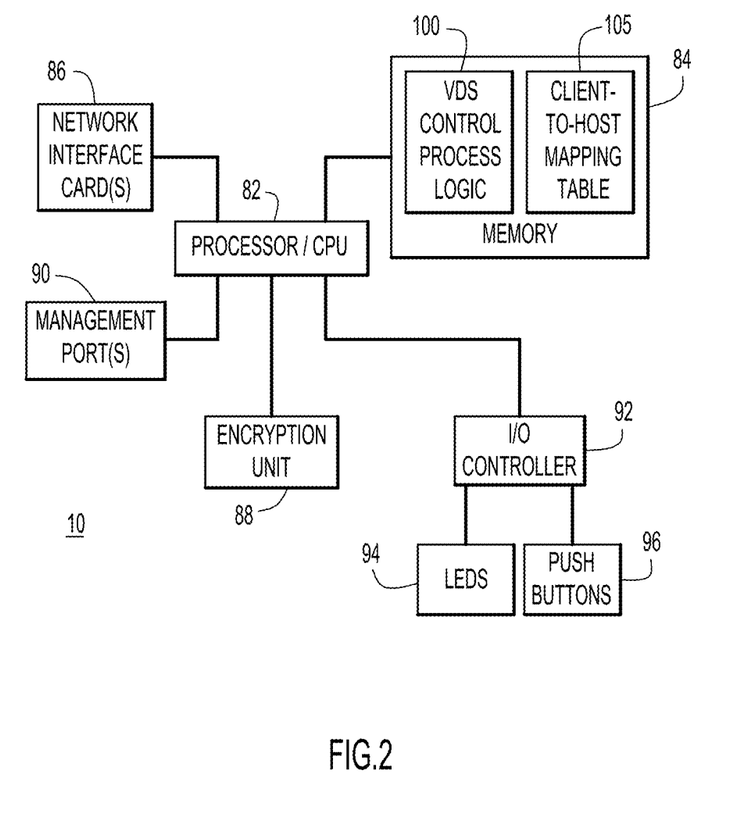
FIG. 2 is an example of a block diagram of the VDS.

Briefly, the VDS 10 is deployed in the network (close to the clients) and inserts itself in a session transparently for the purpose of providing various network and offload services to the VDI sessions without compromising the security of the session. Reference is now made to FIG. 2 for a description of a block diagram of the VDS 10. The VDS 10 may take on any of a variety of platforms/formats depending on certain applications. For example, some or a large part of the functionality of the VDS 10 may be implemented by software on a network Boarder Router, a dedicated communication service appliance or integrated with existing services like a WAN-optimization service. The specific hardware components of the VDS 10 will depend on the particular application and FIG. 2 is meant to be representative of some of the basic components of the VDS 10. Those with skill in the art will appreciate that additional components may be included in the VDS 10 depending on the particular application.

The VDS 10 comprises a processor or central processing unit (CPU) 82, a memory unit 84, one or more network interface cards 86, an encryption unit 88, one or more management ports 90, an input/output (I/O) controller 92, one or more LEDs 94 and one or more push buttons 96. The processor 82 may include onboard or internal memory (not specifically shown in FIG. 2). Stored in memory 84 (or the onboard memory of processor 82) are software instructions for VDS control process logic 100. The operations of the VDS control process logic 100 are described hereinafter in connection with FIGS. 3-8. As part of the functions of the VDS control process logic 100, a client-to-host mapping table 105 is stored that maps each client to its corresponding host for a data (e.g., display) session that the VDS 10 is managing. The VDS control logic 100 includes several components/module:

VDI control session termination logic for inserting the VDS 10 in a VDI display session.

VDI display session handling logic for terminating the data sessions (VDI display sessions) and applying services based on configured policies.

Host channel logic that interacts with the VDS Host Agent 21 to identify the user actions that require additional processing by the VDS 10, such as inserting a multimedia stream or voice stream and/or control actions like one or more of re-size, move, pause, stop, replay, rewind, associated with the multimedia data for the host.

Application logic that is responsible for performing application specific actions, like fetching video natively from the source etc., based on the requests from Host channel logic.

Software crypto logic that is responsible to perform encryption/decryption operations on the display protocol data with/without using encryption hardware. This logic also handles the credentials required for crypto operations.

Transport termination logic that is responsible for termination of the display and control sessions at the transport layer.

Network service logic that is responsible for applying network services such as shaping/marking, flow-control, monitoring, and Netflow statistics collection.

The processor 82 may comprise a microprocessor or microcontroller. The network interface cards 86 may include the capabilities for Gigabit Ethernet connectivity for a variety of the network communication functions of the VDS 10. The encryption unit 88 handles encryption and decryption of trusted communications as needed. The management ports 90 are provided for management/programming of the VDS 10.

Memory 84 may comprise read only memory (ROM), random access memory (RAM), magnetic disk storage media devices, optical storage media devices, flash memory devices, electrical, optical, or other physical/tangible memory storage devices. Thus, in general, the memory 84 may comprise one or more tangible (non-transitory) computer readable storage media (e.g., a memory device) encoded with software comprising computer executable instructions and when the software is executed (by the processor 82) it is operable to (or otherwise causes the processor 82 to) perform the operations described herein in connection with the VDS control process logic 100.

Figure 3:
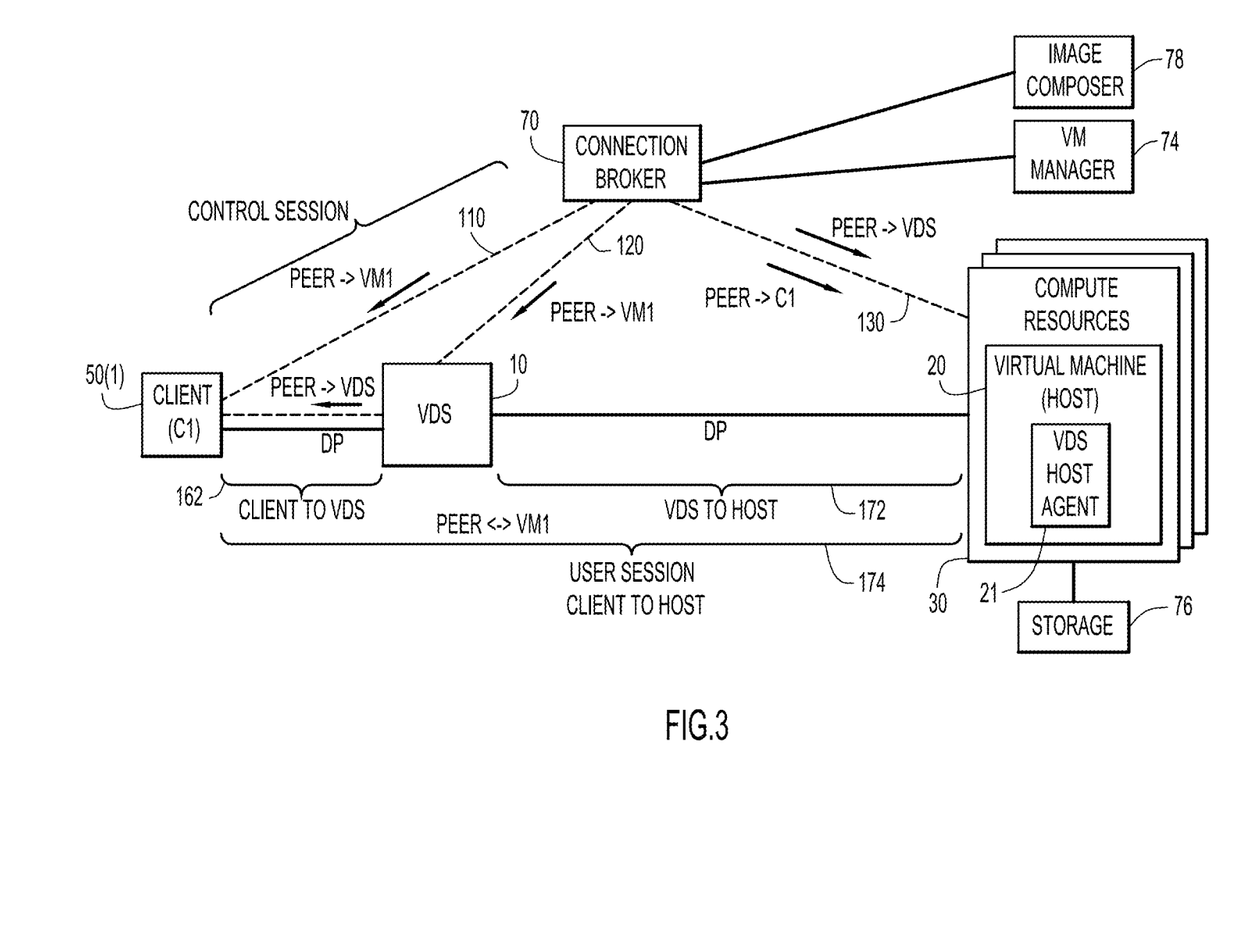
FIG. 3 is a diagram similar to FIG. 1 but illustrating the operational flow in which the VDS proxies a data session between a client and a host.
Figure 4:
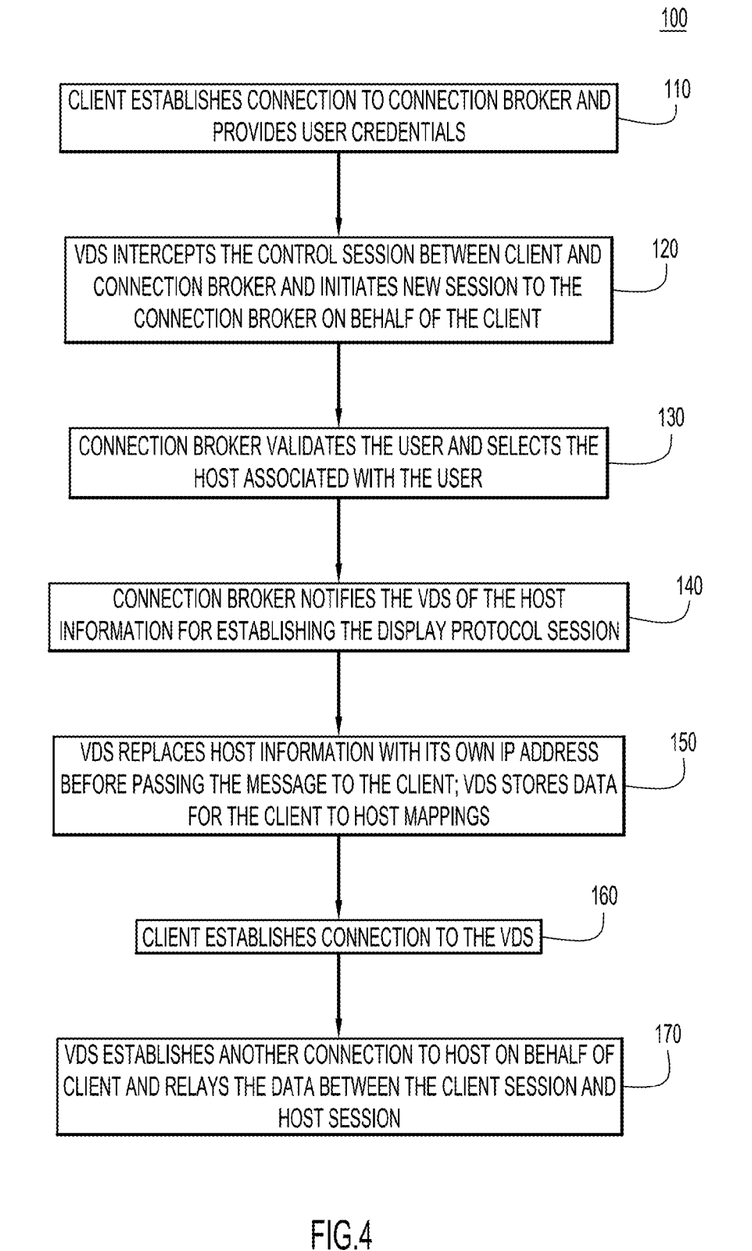
FIG. 4 is a flow chart of the operational flow for the scenario depicted in FIG. 3.

Reference is now made to FIGS. 3 and 4 for a description of the operations of the VDS 10. One function of the VDS 10 is to intercept a session between a client and a host, e.g., a display protocol session, apply network policies and offload multimedia processing from the host. Some sessions, e.g., a display protocol session, between the client and the host are usually encrypted with a session key. The VDS 10 needs to acquire the session key for processing the display sessions. The following two options are useful for acquiring the session key.

Pass-thru Mode: In this mode, the VDS 10 is provisioned with a host certificate. This ensures that the VDS 10 can decrypt the initial negotiation phase of the display session establishment and acquire the session key. This method involves provisioning the host certificates/distributing the certificates securely to the VDS 10 in the network.

Intercept Mode: In this mode, the VDS 10 intercepts the control session between the client and the connection broker. This ensures that the VDS 10 can present itself as the peer to both client and host. This will allow the VDS 10 to use its own certificate for the communication. Various steps of the session establishment in this mode are explained below.

In the example shown in FIG. 3, client 50(1) is involved in a session, e.g., a display protocol session, with a host VM 20.

The client 50(1) is provisioned with the connection broker information, i.e., Internet Protocol (IP) address and host name, and the particular method of communication to the connection broker. For example, the communication method is Extensible Markup Language (XML)-based over Hypertext Transfer Protocol (HTTP) or secure HTTP (HTTPS). The information exchanged depends on the connection broker 70.

At 110, when a user associated with client 50(1) desires to make the connection to the host, e.g., VM 20, the client 50(1) establishes the connection to the connection broker 70. The client supplies user credentials to the connection broker 70 at this time. Packets of this session are intercepted by the network and redirected to the VDS 10. The actual interception mechanism can be made using any of a variety of techniques including, Policy-Based Routing (PBR) with object tracking, Web Cache Communication Protocol (WCCP), static route or any other mechanism that can steer the traffic to the VDS 10. The VDS 10 is transparent with respect to network address translation (NAT).

When PBR is used, the PBR policy would be configured on all the client side interfaces in the device which needs to steer the traffic directed to the connection broker 70 towards the VDS 10. The PBR policy route-map Access Control List (ACL) matches the traffic directed to the connection broker 70 from the clients (the match criteria depending and varying based on the connection broker protocol being used) and selects the VDS Host Standby Router Protocol (HSRP) IP address as a next-hop with an IP Service Level Agreement (SLA) tracking option to detect the condition of failure of a VDS (active VDS or standby VDS). If the active VDS fails, the standby VDS will become HSRP active and take over the processing and this can be transparent to the traffic steering PBR policy. If both VDS's fail, the PBR will fail and normal forwarding will apply with no intercept of the further traffic directed to connection broker 70 until one of the VDS's is up again. The VDS terminates the connection broker 70 requests and initiates new requests with its IP address. This IP address can be the unique IP address assigned to the VDS in the VDS subnet. Thus, in case of fail-over, existing connection traffic from hosts will be coming to this IP address and this traffic is either "black-holed" (until the VDS device comes back up as standby) or when it is up as a new standby, the VDS can send Internet Control Message Protocol (ICMP) unreachable messages back to the host when it sees the traffic. The VDS can have the default route set to the HSRP IP address of the router to forward its initiated requests to the connection broker 70.

The WCCP Layer 2 (L2) redirect option with mask assignment may be used for traffic steering. The WCCP policy can be applied in the egress direction on the WAN side interface of an ISR to intercept the connection broker protocol traffic towards the connection broker 70 (and skipping interception of the connection broker protocol traffic from the VDS IP address). The WCCP policy can be applied in the ingress direction in the campus distribution switch on the access-side interfaces or on the core side interfaces in the data-center distribution switch (assuming ingress WCCP is a preferred option). The active VDS will participate in the WCCP protocol and will be the single operational cache engine device for the WCCP service-group. When the active VDS fails and the standby VDS assumes the role of the new active it can initiate the WCCP protocol with the traffic steering device to join the WCCP service-group (with the old active VDS dropping out of the service-group). When load balancing is supported both VDS's can be operational in the WCCP service-group.

A static route option can be used when there is a mapped connection-broker IP address. In this case, a static route is setup for the connection broker IP address to route the packets to HSRP IP address of the VDS 10. If the VDS 10 uses the same connection broker IP address for its sessions to the connection broker 70 after terminating the connections from the clients to the connection broker 70, this traffic will be redirected back to the VDS 10 based on the static route. Thus, the VDS 10 will use the mapped IP address for its sessions to the connection broker 70. The connection broker 70 is accessible with its original as well as mapped IP address. The static route will be configured with a tracking option so that the static route will be operational only when the VDS 10 is up. When both the active and standby VDS's are down, default routing will apply for the client traffic to the connection broker 70.

For an HTTPS session, the VDS 10 is provisioned with the connection broker certificate as described above.

At 120, the VDS 10 intercepts the control session between the client 50(1) and the connection broker 70 and initiates a new session to the connection broker 70 on behalf of the client 50(1). In so doing, the VDS 10 will proxy this session by terminating the client session and originating a new session to the connection broker 70. Messages from the client 50(1), including user credentials, are relayed to the connection broker 70 as is, except that the VDS 10 will present itself as the client to the connection broker 70.

At 130, the connection broker 70 validates the user and determines the host, e.g., VM, associated with the user. If there are multiple hosts for the user, the user is prompted to select one of the hosts. If the host is not active then the connection broker 70 instructs the image composer 78 to create a virtual disk for the user. The image composer 78 forms the virtual disk image from the golden image, application images, user profile and user data. This step is not required if per user disks are stored in the storage unit 76. The connection broker 70 instructs the VM manager 74 to launch the host as a VM, e.g., VM 20, on one of the available physical servers of the compute resources 30.

Once the host is up, the connection broker communicates to the VDS Host Agent 21 running in the host VM 20 and provides the user credentials for single sign-on, the VDS identity for the session. The host waits for the connection from the VDS 10.

At 140, the connection broker 70 notifies the host information (IP address of the host) to the VDS 10 for establishing the data session, e.g., a display protocol session. The VDS 10 now has information identifying the host VM 20 that is associated with the data session requested by the client.

At 150, the VDS 10 replaces host information with its own IP address before passing the control session message to the client. Also at 150, the VDS 10 will maintain the client-to-host mappings internally in the mapping table 105.

At 160, the client establishes a data session and communicates to VDS 10 as if the VDS 10 is the host. This is shown at 162 in FIG. 3. At 170, the VDS 10 establishes another data session, e.g., display protocol session, with the host VM 20, presenting itself as the client to the host VM 20. This data session is shown at 172 in FIG. 3. The VDS 10 will relay the data between the client session and the host session. This is shown at 174 in FIG. 3.

The operational flow of the VDS 10 depicted in FIGS. 3 and 4 may be summarized as follows. A network device is deployed in a network to intercept packets of a control session initiated by a client between the client and a connection broker to obtain data from a host. The network device initiates a new control session to the connection broker on behalf of the client. The network device receives host information from the connection broker, replaces address information of the network device for the host information in a control session message and sends the control session message to the client. The network device also stores data that maps the client to the host. The network device receives from the client a connection request message for a data session with the host and establishes a data session with the client. The network device initiates a data session with the host on behalf of the client and relays data between the data session with the host and the data session with the client such that the network device is transparent to the client and the host. Various applications and extended service capabilities can be supported using a network device configured in this manner. The data session may be a display protocol session, i.e., VDI session, multimedia streaming session, etc. The term "multimedia" used herein is meant to include video, digital images, audio (e.g., voice, music, etc.), interactive video, and sharing of content such as documents, images, and video.

Moreover, from the perspective of the Host VDS Agent 21, a method is provided that can be summarized as follows. A host agent running in a host virtual machine on compute resources in a datacenter, receives from a connection broker a communication that includes user credentials of a user at a client and an identity of a network device that has intercepted a control session initiated by the client to initiate a data session with the host virtual machine. A request is received from the network device to initiate a data session on behalf of the client. The host agent thereafter communications with the network device in the course of the data session. The data session may be a display protocol session or a multimedia streaming session, for example. When the data session is a multimedia streaming session, the host agent prevents the host virtual machine from fetching multimedia data for the multimedia streaming session, and extracts from a request for the multimedia streaming session information about the multimedia streaming session including a Universal Resource Locator for the multimedia data. The host agent sends the information about the multimedia streaming session to the network device via a control channel in a display protocol session to enable the network device to communicate directly with a source of the multimedia data. When the data session is a real-time communication session, the host agent communicates media controls between the host virtual machine and the network device during the real-time communication session.

Using this scheme, the VDS 10 will be able to examine/modify the communication between the host and client. The network redirects the control session (session to the connection broker 70) only to the VDS 10. For the data session, since the IP address of the VDS 10 is used as the endpoint address, regular forwarding will send the frames to the VDS 10. The VDS 10 does not require an additional login.

In this scheme, the VDS 10 first intercepts the communication between the client and the connection broker. This traffic is identified by the connection broker IP address and optionally the destination port. Such traffic is redirected and intercepted by the network element using well known schemes like WCCP, static routes, PBR or inline traffic inspection. Even if the session is secure, such as a Secure Socket Layer (SSL) session, by provisioning the connection broker certificate on the VDS 10, it can be ensured that the network element can intercept this session. Once the connection broker traffic is intercepted, the VDS 10 proxies the session by changing the client IP address with its own IP address. Thus, the connection broker will see the VDS's address as the client address as if the user is attached to this address. The connection broker will notify the VDS address as the client address to the host and the host expects the client communication from the VDS 10. Since the VDS 10 proxies the control session, the connection broker host IP notification message is first seen by the VDS 10. The VDS 10 can replace the host IP address with its own address before forwarding the message to the client. Also, the VDS 10 will maintain internally the association between the client and the original host IP address from the connection broker. The client will treat the VDS 10 as its host and establish the display protocol session to the VDS 10. The VDS 10 in turn will obtain the host IP address associated with this client and establish a data session, e.g., a display protocol session, with the host using its own IP address as the client address. These two sessions are "stitched" together by the VDS 10 for data communication. In this case, any security parameter negotiation by the client or host will be with the VDS 10. This will enable the VDS 10 to present its own credentials for validation. The data from one session is sent over to the other session so that the actual communication can be between the client and the host while the VDS 10 terminates the transport session. The VDS 10 not only will be able to inspect the communication but can insert or modify the data passed between these two sessions. This capability can be used by the VDS 10 for providing various network services like visibility, Quality of Service (QOS), admission policies as well as for providing offload services like rich-media offload. The VDS 10 has the ability to inspect or modify the communication data between the client and the host.

Figure 5:
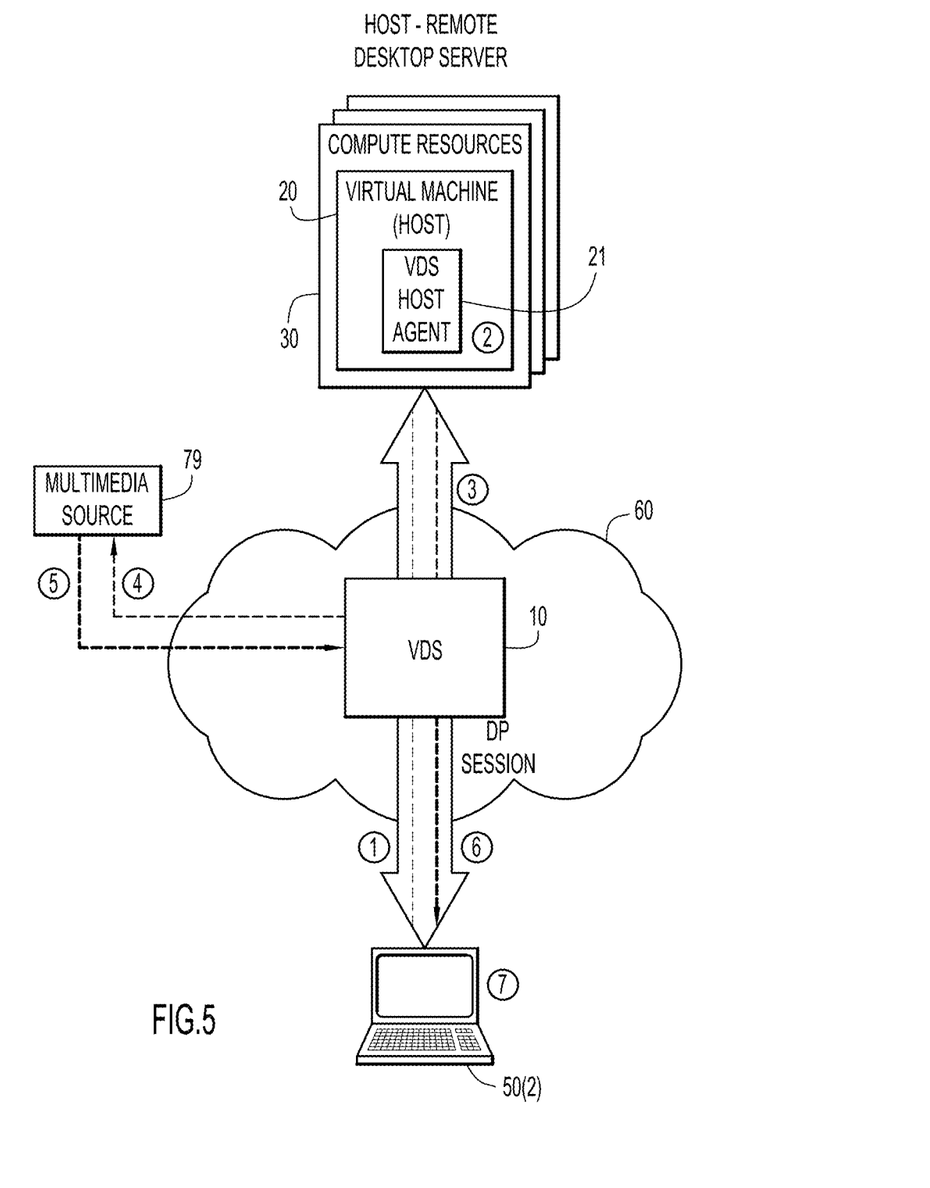
FIG. 5 is a diagram depicting the operation flow in which the VDS proxies a multimedia streaming session between a client and a host.

Reference is now made to FIG. 5. FIG. 5 shows an example use of the VDS 10 for multimedia off-loading. At (1), a user sitting behind a thin client 50(2) is connected via RDP, for example, to a data center VM 20 (via the VDS Host Agent 21) on compute resources 30 through the VDS 10. The user requests a multimedia stream via one or more of a standalone multimedia player application, embedded player application and web browser application. The VDS 10 inserts itself in the VDI session between the client and the host VM 20 using the mechanism described above in connection with FIGS. 3 and 4. At (2), the application (VM 20) in the host normally would try to fetch the multimedia from the network, but the VDS Host Agent 21 will hook the application and prevent this from happening. The VDS Host Agent 21 will instead extract some information on the multimedia session requested, e.g., the Universal Resource Locator (URL) requested and the place on the user's screen where this should be rendered. At (3), the information extracted by the VDS Host Agent 21 at (2) is passed to the VDS 10 via a control channel embedded inside the display protocol (DP) session, e.g., inside the VDI session. This is transparent to the client and the user since the VDS 10 terminates this channel inside the VDI session. As a result, the system administrator does not have to manage yet another network resource and be concerned with opening extra firewall ports, for example. The VDS Host Agent 21 intercepts the multimedia requests using player/browser provided options, such as DirectShow filters, etc., and passes the URL information for the multimedia to the VDS 10 inside the VDI control channel. At (4), the VDS 10 reacts to messages received in the VDI control channel at (3) by contacting the multimedia source 79 directly or via a Content Delivery Network (CDN) if available. If there is a media-optimizer in the network like a caching device or stream splitting device (for broadcast video), the request from the network device will appear like a regular video request to the media-optimizer. Hence, the media-optimizer would be able to service this request and thereby optimize the bandwidth utilization.

At (5), the multimedia source 79 delivers the multimedia data towards the VDS 10. At (6), the VDS 10 inserts the multimedia data in the VDI session towards the client in the display protocol format, e.g., by leveraging an existing Multimedia Redirect (MMR) infrastructure as in case of RDP. At (7), the thin client 50(2) renders the multimedia content. The client renders the multimedia as if it was sourced by the VM 20.

Figure 6:
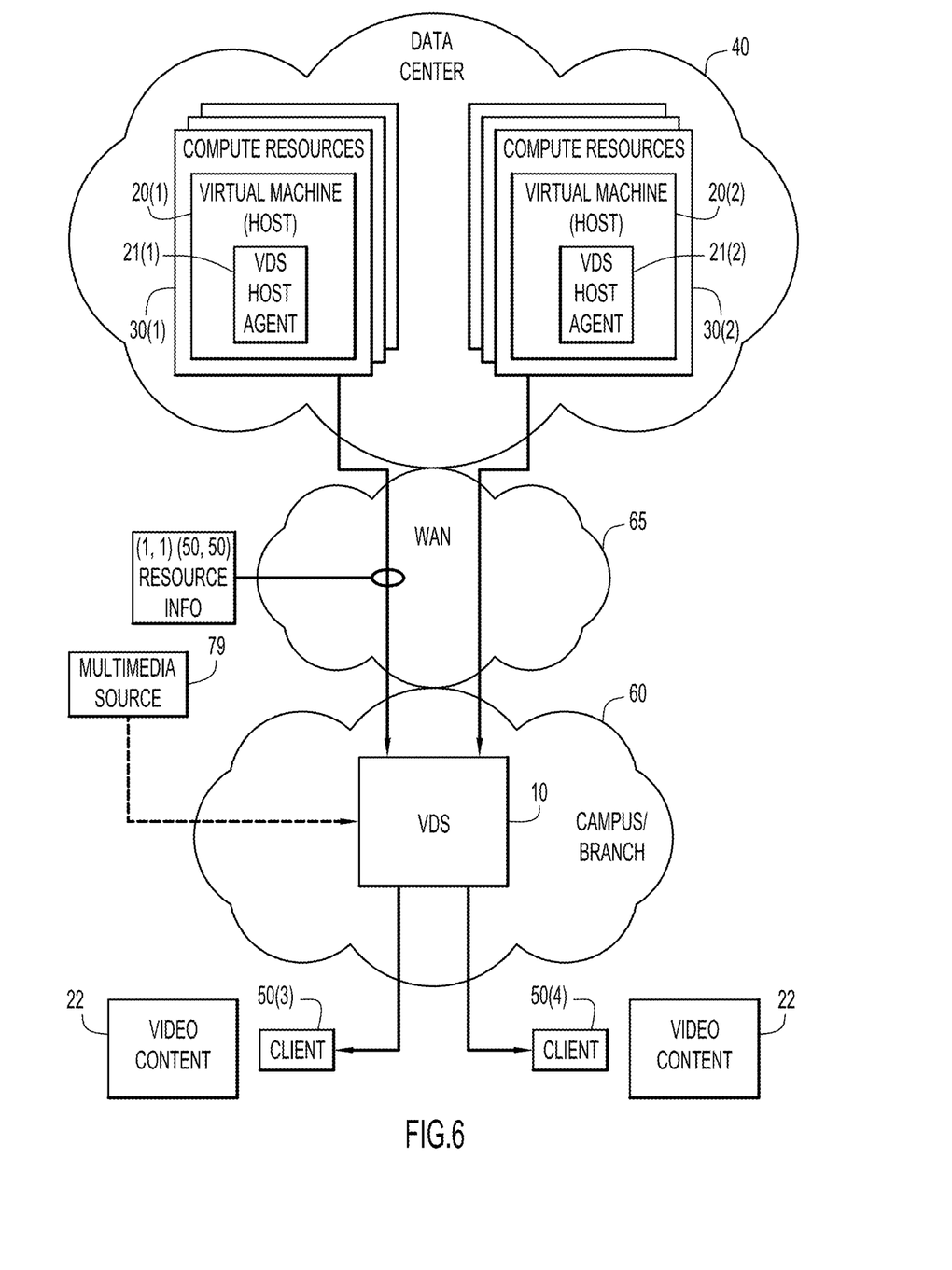
FIG. 6 is a diagram depicting the operation flow in which VDS proxies a multimedia streaming session for the same multimedia to multiple clients.

Reference is now made to FIG. 6. FIG. 6 shows an extension of the scheme shown in FIG. 5. In the scenario of FIG. 6, there are VDS Host Agents 21(1) and 21(2) installed in VMs 20(1) and 20(2), respectively, at compute resources 30(1) and 30(2), respectively, and there are two clients 50(3) and 50(4). The datacenter 40 and the campus/branch 60 are coupled via WAN 65. The VDS 10 gets information about the requested multimedia, e.g., URL and placement information (e.g., (1,1) (50,50)) from one of the VDS Host Agents, fetches the multimedia from the multimedia network and sends it to a client. When the same multimedia data is requested by two or more clients, e.g., clients 50(3) and 50(4), the VDS 10 replicates that multimedia data and sends it to all of the clients that requested that multimedia data. The video content for the multimedia data is shown at reference numeral 22 in FIG. 6. One advantage of the arrangement shown in FIG. 6 is that the multimedia requests are redirected to the VDS 10 for processing, by the VDS agent, allowing for seamless insertion of multimedia into the VDI stream to the clients, and support for stream replication in the network. Also, in the hosted environment, the multimedia data is maintained locally. Moreover, no changes need to be made to the clients for the scenario shown in FIG. 6.

Figure 7:
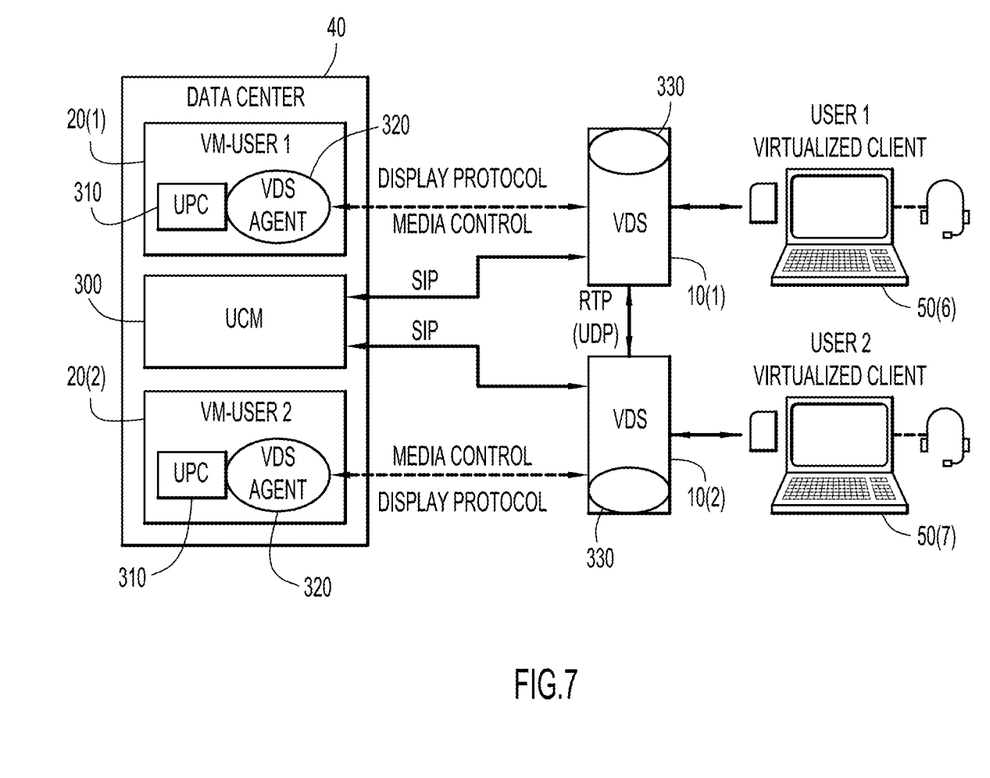
FIG. 7 is a diagram depicting a more general application of the VDS to create a composite virtual desktop for a client device from multiple application sources.

Reference is now made to FIG. 7. FIG. 7 shows an application of a VDS for unified real-time communications client support between at least two users, such as part of a Unified Communication (UC) system. There are two instances of a VDS in this scenario, shown at reference numerals 10(1) and 10(2), which communicate with each other via the Real-time Transport Protocol (RTP) or Universal Datagram Protocol (UDP), and two virtualized clients 50(6) and 50(7) having associated users User 1 and User 2, respectively. At the datacenter 40, there is a Unified Communication Manager (UCM) 300 and a VM for each user, e.g., VM-User 1 20(1) and VM-User 2 20(2). Each VM 20(1) and 20(2) includes a Unified Personal Communicator (UPC) module 310 and a VDS Host Agent 320. In addition, each VDS 10(1) and 10(2) has a UPC media termination module 330. The UPC module 310 in each VM 20(1) and 20(2) performs call control operations and media termination is handled by the UPC media termination module 330 in the VDS 10(1) and VDS 10(2). Each VDS establishes an RTP session on behalf of the applicable client. The VDS Host Agent 320 running on the VMs facilitates media control between the VM and the corresponding VDS during the real-time communication session. Session control is handled using an applicable protocol, such as the Session Initiation Protocol (SIP). The use of the VDS in the environment shown in FIG. 7 affords the ability to redirect SIP traffic to the associated VDS. In so doing, the VDS serves as a relay agent for the client and a proxy for the communication session data (media termination) while call control is with the host, e.g., the VMs. In other words, the VDS relays communication session data with the client during the communication session while communication session control operations are maintained by the host VM.

Figure 8:
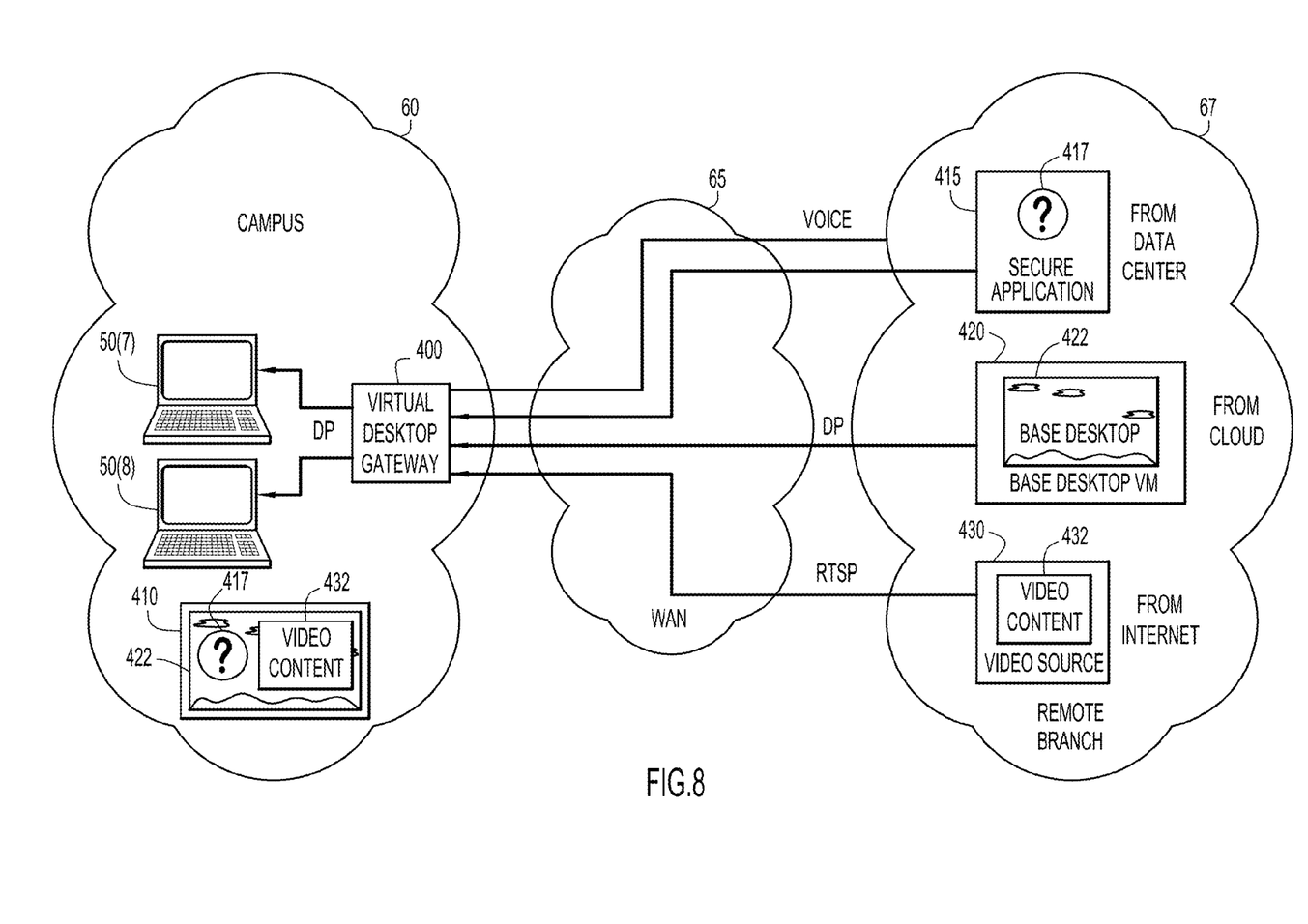
FIG. 8 is a diagram depicting an application of the VDS in a unified communication system.

Reference is now made to FIG. 8. In this example, the VDS 10 referred to above is generalized into a virtual desktop gateway shown at reference numeral 400 deployed in a campus network 60 that connects by way of WAN 65 to a remote branch site 67. The virtual desktop gateway 400 can construct composite user desktops by collecting data to be displayed from multiple different sources. For example, the virtual desktop gateway may construct a composite user desktop 410 for one of the clients 50(7) and 50(8) by collecting displays from different sources, e.g., from a secure application 415 (signified by graphic element icon 417) in a data center, a user base desktop 422 from a VM 420 in a cloud and multimedia content 432 from a Internet-based multimedia (video) source 430. There are VDS Host Agents (not shown) running in each of the secure application 415, user base desktop application VM 420 and Internet-based video source 430. The video from the video source 430 may be communicated using a protocol, such as the Real-time Transport Streaming Protocol (RTSP). The clients, e.g., clients 50(7) and 50(8), need not be configured with any special software or hardware. For example, RDP uses DirectX drawing primitives. Layers are used to construct a composite desktop in a scalable manner. In another example, PCoIP uses pixel primitives. The VDS maintains the desktop state for efficient composition. These techniques can be used for non-compute applications, such as voice and video communications (IP telephony). The virtual desktop gateway dynamically multiplexes user input to different host sessions based on a focused application of a user, and provides integration of the applications from the different sources, dropping an application when it is closed or terminated and adding a new application when it is opened or activated.

Thus, the virtual desktop gateway 400 has the ability to host applications at multiple locations (clouds) and provide a unified view to the end users. In this case, when the initial control request from the client is received, the virtual desktop gateway 400 will interact with one or more connection brokers based on a locally resolved policy so that all the resources (Hosts) at different locations can be made available to the client. The virtual desktop gateway 400 is responsible for maintaining the mapping between one client session to multiple host sessions. In this mode, the virtual desktop gateway 400 intelligently maps the user inputs to one of the host sessions. For example, if a user selects an icon on the base desktop associated with the application running in a remote datacenter, the virtual desktop gateway 400 will detect the same using the VDS Host Agent running on the base desktop VM 420 and launches the application in the remote datacenter. This application is composed on top of the existing desktop. The user input is multiplexed to the correct host session based on the highlighted (focused) application. For this purpose the virtual desktop gateway will track the location of the cursor and focused window in the desktop.

In summary, a mechanism is provided herein in which the network element is inserted in a VDI session without the need to modify the client or host configuration or software. The network element will have the ability to inspect or modify the communication data between the client device and host compute node. In addition, the network element can be used to handle redirected multimedia requests in order to offload the compute functions needed for multimedia processing. The network element proxy-fetches the multimedia directly from the source in the native format and inserts the media stream into the display session in the display protocol format making the solution completely transparent to client.

Visibility, Monitoring, Traffic Steering and Other Functions of VDS

Since the VDS 10 is inserted between a client and host, it can provide a variety of service level functions including marking, shaping, flow-control, visibility (user session, channel level and protocol level), monitoring, and policy enforcement.

Visibility

The VDS 10 can be configured to collect information to be used to identify and troubleshoot VDI sessions. The identity and protocol specific information is available for proactively controlling network Quality of Service (QoS) and user Quality of Experience (QoE) as well, and for charge back to enable the Data-as-a-Service (DaaS) model.

For a specific session, the VDS 10 can retrieve data for user session visibility such as: end device identifier, user identifier, IP address (end device, VM), connection broker, VDS that is managing the session, and login/logout time.

To obtain VDI session channel visibility, for a specific session, the VDS 10 can be configured to retrieve the relevant identifiers and the performance parameters, depending on the display protocol such as: control channel, keyboard/mouse, USB data (device type, bandwidth, cumulative amount of data), printing (bandwidth, cumulative amount of data), voice (bandwidth, in/out), video (bandwidth, in/out), synchronization between streams (e.g. audio/video, and display channel.

For display protocol visibility, the VDS 10 is aware of the particular display protocol employed to provide specific performance information aggregated across sessions.

For VDI session visibility, the VDS 10 supports (NBAR—Network Based Application Recognition). The VDS 10 retrieves the relevant identifiers and performance parameters for mission critical business applications (user configurable), for example.

The VDS is also configurable to characterize offloaded traffic. For example, the VDS can compute a protocol specific performance characterization of the data flows directly terminated by the VDS to offload the VMs. The performance data may be available aggregated across data sources, and per individual data source (media stream, voice channel).

Examples of performance data that may be computed include: throughput, error rate, retransmissions, dropped packets, latency and jitter. This data may be available aggregated across data sources, and per individual data source (media stream, voice channel).

The VDS 10 is also configurable to provide continuous monitoring of vital performance parameters and support threshold based alerts, traps and syslog entries.

Marking

The VDS 10 is configurable to prioritize different channel types by assigning them to different egress queues within the VDS itself, and by scheduling these queues according to their configured bandwidth and priority. Since internal queuing occurs before packets go through the VDS Transmission Control Protocol (TCP) module, there is no TCP reordering by the VDS.

The VDS can classify a VDI traffic session for QoS. For example, the VDS can provide QoS classification—DSCP (Differentiated Services Code Point) marking, to enable network QoS for control channels, video channels, and rich media channels (telephony/videoconferencing), display graphics from a VM to the client, within a VDI session depending on the protocol.

The VDS 10 can also perform policy-based admission control to allow/deny user access to the VDI infrastructure depending on the policy. The policy may be based on client subnet, individual client, location, time of day and class/group of users.

The above description is intended by way of example only.

What is claimed is:
1. A method comprising:
  at a network device, intercepting packets of a control session initiated by a client between the client and a connection broker to obtain data from a host;
  initiating a new control session to the connection broker on behalf of the client;
  receiving host information from the connection broker;

replacing address information of the network device for the host information in a control session message of the new control session and sending the control session message from the network device to the client;

storing at the network device data that maps the client to the host;

receiving at the network device from the client a connection request message for a data session with the host and establishing a data session with the client, wherein the data session is multimedia streaming;

directing the multimedia data from a multimedia source to the client;

the network device initiating a data session with the host on behalf of the client and relaying data between the data session with the host and the data session with the client such that the network device is transparent to the client and the host;

receiving at the network device from a host agent running in a host virtual machine information about multimedia data to be streamed to the client;

communicating with the multimedia source to obtain the multimedia data from the multimedia source;

receiving the multimedia data from the multimedia source; and sending the multimedia data via a display protocol session to the client.

2. The method of claim 1, wherein the data session with the host and the data session with the client is a display protocol session.

3. The method of claim 1, wherein intercepting comprises using one or more of: policy-based routing to direct packets of the control session to the network device; a web cache communication protocol to direct packets of the control session to the network device; and static routing techniques to direct packets of the control session to the network device.

4. The method of claim 1, wherein receiving information about the multimedia data comprises receiving a Universal Resource Locator associated with the multimedia source within a control channel of the display protocol session.

5. The method of claim 1, further comprising receiving information related to user control actions including one or more of re-size, move, pause, stop, rewind, associated with the multimedia data.

6. The method of claim 1, further comprising intercepting by the host agent multimedia requests made from one or more of standalone multimedia player applications, embedded player applications and web browser applications.

7. The method of claim 1, and further comprising the network device replicating the multimedia data and sending the multimedia data to multiple clients.

8. The method of claim 1, wherein initiating comprises initiating a data session with each of multiple hosts of different applications to be rendered on a desktop of the client.

9. The method of claim 1, wherein the data session is a real-time communication session between users, and further comprising the network device relaying communication session data with the client during the real-time communication session while communication session control operations are maintained by the host.

10. The method of claim 1, and further comprising inspecting or modifying communication data between the client and the host.

11. One or more non-transitory computer readable storage media encoded with software comprising computer executable instructions and when the software is executed operable to:

intercept packets of a control session initiated by a client between the client and a connection broker to obtain data from a host;

initiate a new control session to the connection broker on behalf of the client;

receive host information from the connection broker;

replace address information of a network device for the host information in a control session message of the new control session and send the control session message from the network device to the client;

store data that maps the client to the host;

receive at the network device from the client a connection request message for a data session with the host and establish a data session with the client;

initiate a data session with the host on behalf of the client and relay data between the data session with the host and the data session with the client such that the network device is transparent to the client and the host;

receive at the network device from a host agent running in a host virtual machine information about multimedia data to be streamed to the client;

communicate with a multimedia source to obtain the multimedia data from the multimedia source;

receive the multimedia data from the multimedia source; and send the multimedia data via a display protocol session to the client.

12. The non-transitory computer readable storage media of claim 11, wherein the instructions operable to receive information about the multimedia data comprises instructions operable to receive a Universal Resource Locator associated with the multimedia source within a control channel of the display protocol session.

13. The non-transitory computer readable storage media of claim 11, and further comprising instructions operable to replicate the multimedia data and send the multimedia data to multiple clients.

14. The non-transitory computer readable storage media of claim 11, wherein the instructions operable to initiate comprise instructions to initiate a data session with each of multiple hosts of different applications to be rendered on a desktop of the client.

15. The non-transitory computer readable storage media of claim 14, further comprising instructions operable to multiplex user input to different hosts sessions based on a focused application of a user.

16. The non-transitory computer readable storage media of claim 15, wherein the data session is a real-time communication session between users, and further comprising instructions operable to relay communication session data with the client during the real-time communication session while communication session control operations are maintained by the host.

17. An apparatus comprising:
a network interface unit configured to enable communications over a network; and
a processor coupled to the network interface unit and configured to:
intercept packets of a control session initiated by a client between the client and a connection broker to obtain data from a host;
initiate a new control session to the connection broker on behalf of the client;
receive host information from the connection broker;
replace address information of a network device for the host information in a control session message of the new control session and send the control session message from the network device to the client;
store data that maps the client to the host;
receive at the network device from the client a connection request message for a data session with the host and establish a data session with the client;
initiate a data session with the host on behalf of the client and relay data between the data session with the host and the data session with the client such that the network device is transparent to the client and the host;
receive from a host agent running in a host virtual machine information about multimedia data to be streamed to the client;
communicate with a multimedia source to obtain the multimedia data from the multimedia source;
receive the multimedia data from the multimedia source; and
send the multimedia data via a display protocol session to the client.

18. The apparatus of claim 17, wherein the processor is configured to receive a Universal Resource Locator associated with the multimedia source within a control channel of the display protocol session.

19. The apparatus of claim 17, wherein the processor is configured to replicate the multimedia data and send the multimedia data to multiple clients.

20. The apparatus of claim 17, wherein the processor is configured to initiate a data session with each of multiple hosts that host different applications to be rendered on a desktop of a client.

21. The apparatus of claim 17, wherein the processor is configured to inspect or modify communication data between the client and the host.

22. A method comprising:
at a host agent running in a host virtual machine on compute resources, receiving from a connection broker a communication that includes user credentials of a user at a client and an identity of a network device that has intercepted a control session initiated by the client to initiate a data session with the host virtual machine;
receiving from the network device a request to initiate a data session on behalf of the client, wherein the data session is a multimedia streaming session;
communicating with the network device in the course of the data session;
preventing the host virtual machine from fetching multimedia data for the multimedia streaming session and extracting from a request for the multimedia streaming session information about the multimedia streaming session including a Universal Resource Locator for the multimedia data; and
sending the information about the multimedia streaming session to the network device via a control channel in a display protocol session to enable the network device to communicate directly with a source of the multimedia data.

23. The method of claim 22, wherein the data session is a display protocol session.

24. The method of claim 22, wherein the data session is a real-time communication session, and further comprising the host agent communicating media controls between the host virtual machine and the network device during the real-time communication session.

\* \* \* \* \*